US007031476B1

(12) United States Patent
Chrisop et al.

(10) Patent No.: US 7,031,476 B1
(45) Date of Patent: Apr. 18, 2006

(54) METHOD AND APPARATUS FOR INTELLIGENT SPEAKER

(75) Inventors: Roy Kenneth Chrisop, Camas, WA (US); Gary Lin Gaebel, Vancouver, WA (US); Larry Alan Westerman, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 906 days.

(21) Appl. No.: 09/593,924

(22) Filed: Jun. 13, 2000

(51) Int. Cl.
*H04B 3/00* (2006.01)
*H04R 29/00* (2006.01)
*H04R 1/02* (2006.01)
*H04R 3/00* (2006.01)
*H04M 1/00* (2006.01)

(52) U.S. Cl. .......................... 381/77; 381/96; 381/332; 381/59; 455/552.1; 455/553.1

(58) Field of Classification Search .................. 381/77, 381/96, 332, 334, 335, 59; 455/552.1, 553.1, 455/556.1
See application file for complete search history.

(56) References Cited

U.S. PATENT DOCUMENTS 4,103,235 A * 7/1978 Bryant ....................... 455/228
4,592,088 A 5/1986 Shimada
4,688,257 A * 8/1987 Erickson ..................... 380/274
4,751,464 A * 6/1988 Bridges ...................... 324/318
5,406,634 A * 4/1995 Anderson et al. ............. 381/82
5,532,556 A 7/1996 Anderson et al.
5,609,487 A * 3/1997 Setlabudi et al. ....... 434/307 A
5,640,385 A * 6/1997 Long et al. ................. 370/335
5,818,948 A * 10/1998 Gulick ........................ 381/77
6,064,699 A * 5/2000 Law ........................... 375/244
6,272,351 B1 * 8/2001 Langston et al. ........... 455/507
6,282,296 B1 * 8/2001 Konno et al. ................. 381/96
6,385,322 B1 * 5/2002 Mietling ...................... 381/82
6,466,832 B1 * 10/2002 Zuqert et al. ................. 700/94
6,639,990 B1 * 10/2003 Astrin et al. ................ 381/315
6,766,025 B1 * 7/2004 Levy et al. ................... 381/96

FOREIGN PATENT DOCUMENTS

WO WO 9725833 A1 * 7/1997

* cited by examiner

*Primary Examiner*—Huyen Le
*Assistant Examiner*—Devona E Faulk
(74) *Attorney, Agent, or Firm*—Marger Johnson & McCollom, P.C.

(57) ABSTRACT

A speaker system having intelligence for communication with the amplifier. The speaker system contains a communications module that transmits information across the connection between the speaker system and the amplifier with regard to the speaker characteristics. The communications module may be powered by a rectifier that derives power from a high frequency carrier signal passed to it by a high-pass filter. The method of operating the speaker generates a carrier signal and powers the communications module using the carrier signal. The communications module transmits information to the amplifier so long as the carrier signal is present and shuts down when the carrier signal is no longer present. An optional step includes allowing communication to the speaker system from the amplifier.

9 Claims, 2 Drawing Sheets

METHOD AND APPARATUS FOR INTELLIGENT SPEAKER

BACKGROUND

1. Field

This invention relates to audio systems, more particularly to determining speaker characteristics and matching of audio system components.

2. Background

High-end audio systems typically include various signal production components, such as tuners, CD players, tape decks, and turntables, amplifying components such as receivers and amplifiers, and sound generation elements, usually various configurations of speakers. Connoisseurs of audio systems often buy the components from various manufacturers, or change components of the same manufacturer over the system lifetime.

High-quality equipment available today has commensurately high-quality component signal levels, with broad audio bandwidth and ultra-low distortion. Interfaces exist between the signal generation equipment and the amplification equipment. However, the interface between the amplification equipment and the sound generation equipment is not as well characterized. Current state-of-the-art speakers have nominal impedances of 4 or 8 ohms, matching the output impedance of the amplifier. Beyond that, no general standardization exists.

Speaker characteristics can be derived in several ways. The characteristics can include such performance aspects as maximum power handling capacity, impedance profile, and equalization requirements. Users typically adjust for these characteristics manually, which can be subjective and imprecise, as well as time-consuming. These adjustments typically do not account for the maximum power capacity, except for the manual volume control. Overpowering the speaker can damage or ruin it, resulting in a 'blown' speaker.

Methods have been suggested to compensate for this lack of speaker characterization in audio systems. For example, U.S. Pat. No. 4,592,088, issued May 27, 1986 discloses a method of placing a microphone within a speaker enclosure or housing. The output of the microphone is fed back to the amplifier, providing control of the amplifier output in view of the speaker output. However, this approach relies upon the quality of the microphone as well as the extra interface between microphone and amplifier.

In another example, found in U.S. Pat. No. 5,818,948, issued Oct. 6, 1998, the speaker is powered and communicates along a USB interface. The USB controller receives the audio data along this bus. It also detects when there is no data and manages power to the speakers based upon their status of receiving or not receiving any signals. However, there are no control communications with regard to the speaker characteristics.

Another example can be found in U.S. Pat. No. 5,532,556, issued Jul. 2, 1996. This disclosure includes multiplexing audio and control signals together between audio function units. The control signals do not include information about speaker characteristics, beyond their presence and their status as receiving or not receiving audio signal.

Therefore, a need exists for a method and apparatus for providing speaker characteristics along already-established interfaces in audio systems.

SUMMARY

One aspect of the invention is a speaker system having speaker hardware and a communications module. The communications module transmits information from the speaker system about the speaker characteristics. In one embodiment of the invention, the communications module is powered by a carrier signal. A high-pass filter passes the carrier signal to a rectifier, which provides power to the communications module. The communications module then transmits the speaker characteristic information along the connection between the speaker system and the amplifier.

Another aspect of the invention is a method for operating a speaker system having intelligence. A carrier signal is generated by an amplifier and sent to a speaker system connected to the amplifier. The carrier signal is used to provide power to a communications module that transmits information to the amplifier. The transmission continues until the carrier signal is no longer present. An optional step includes transmitting information from the amplifier to the speaker. The connection may be wired or wireless, the transmission format may be any standardized format, including amplitude modulation of the carrier signal, phase-shift keying, or two-tone modulation among others.

BRIEF DESCRIPTION OF THE DRAWINGS

The invention may be best understood by reading the detailed description with reference to the drawing(s), wherein.

DETAILED DESCRIPTION OF THE EMBODIMENTS

Figure 1:
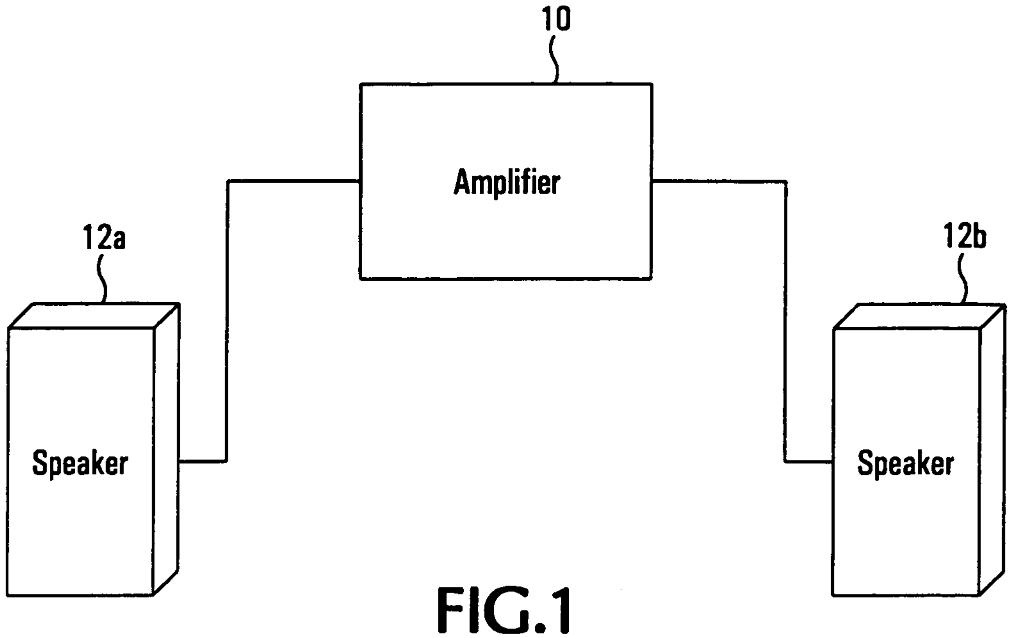
FIG. 1 shows one embodiment of a block diagram of an audio system including an amplifier and speakers, in accordance with the invention.

FIG. 1 shows an amplifier 10 connected to speakers 12*a* and 12*b*. Amplifier 10 is merely intended as an illustration of the sound generation and amplification portions of a sound system. Typically, sound systems include a tuner/receiver, a CD player, tape deck, turntable or some other type of sound production equipment. Similarly, the speakers 12*a* and 12*b* are show connected to the amplifier 10 through wired connections. It must be understood that the connection between the speakers and the amplifier could also be wireless. However, for purposes of discussion, and with no intention of limiting the invention, a wired connection will be assumed.

Figure 2:
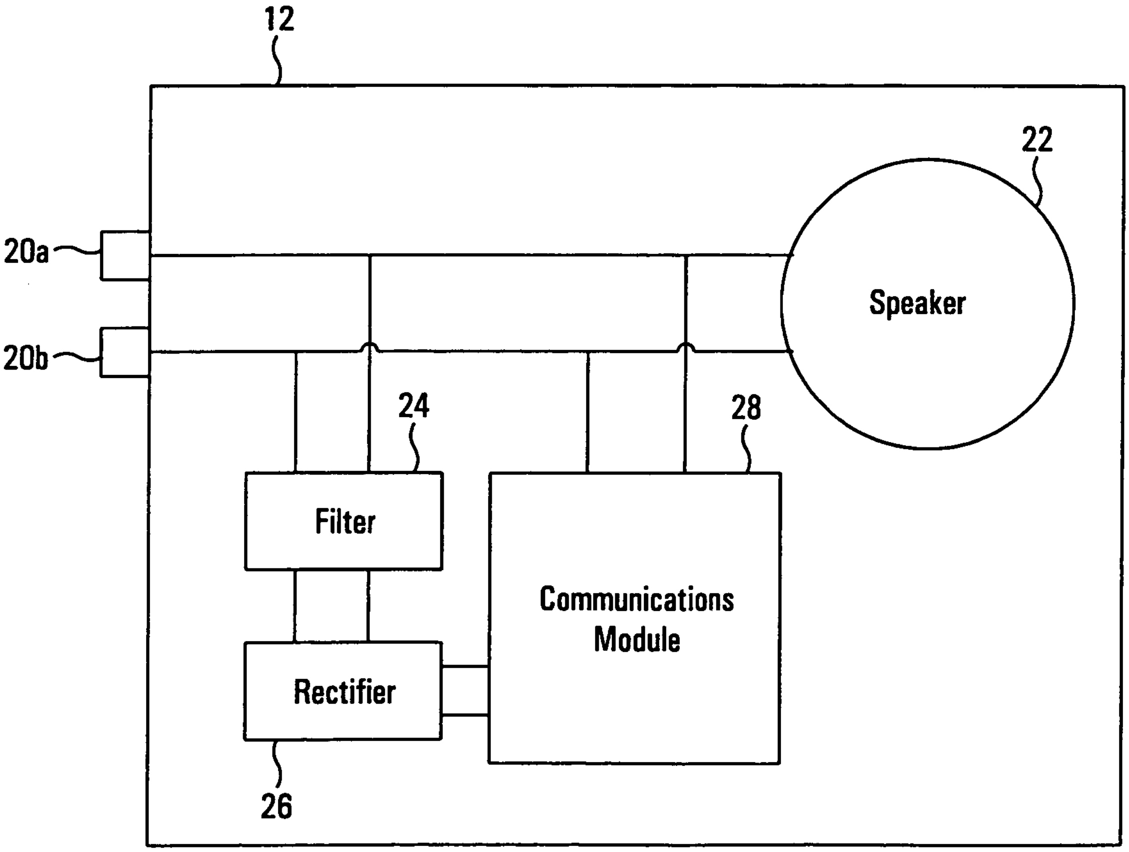
FIG. 2 shows one embodiment of a block diagram of an intelligent speaker, in accordance with the invention.

The speakers 12*a* and 12*b* of FIG. 1 have several components in them other than just the speaker hardware. For that reason, they will be referred to as speaker systems. A more detailed block diagram of a speaker system 12 is shown in FIG. 2. The speaker system 12 housing connects to the amplifier via connections 20*a* and 20*b*. These are shown a wired connection. If this were a wireless speaker system, there would be a wireless receiving module in place of the connections 20*a* and 20*b*. The speaker hardware, such as woofers and/or tweeters, is shown as speaker 22. The intelligence of the speaker lies in the three components of the high-pass filter 24, the rectifier 26 and the communications module 28.

The speaker system is powered by a high frequency carrier signal. High-pass filter 24 passes the high frequency signal to the rectifier 26. The rectifier 26 operates to convert the high frequency carrier to power, which is used to power the communication module 28. Communication module 28, upon receiving power, will start transmitting through the speaker connections 20_a_ and 20_b_. The transmission will send the speaker characteristics to the amplifier.

There are several methods by which the communication module can transmit to the amplifier. These include amplitude modulation of the carrier signal, phase-shift keying, and two-tone modulation. The amplifier would require a module capable of receiving this transmission and interpreting its contents. In some situations, it may be desirable for the amplifier to receive all types of transmissions from speakers, so one amplifier may be used with any type of intelligent speaker.

The communication module 28 will continue to transmit so long as there is a carrier signal. The amplifier may have a switching or polling mechanism that allows it to provide carrier signals only to those speakers with which it wants to communicate. When the amplifier has received the information, it can shut down communications by dropping the carrier signal. Without the power derived from the carrier signal, the communication module shuts down.

Figure 3:
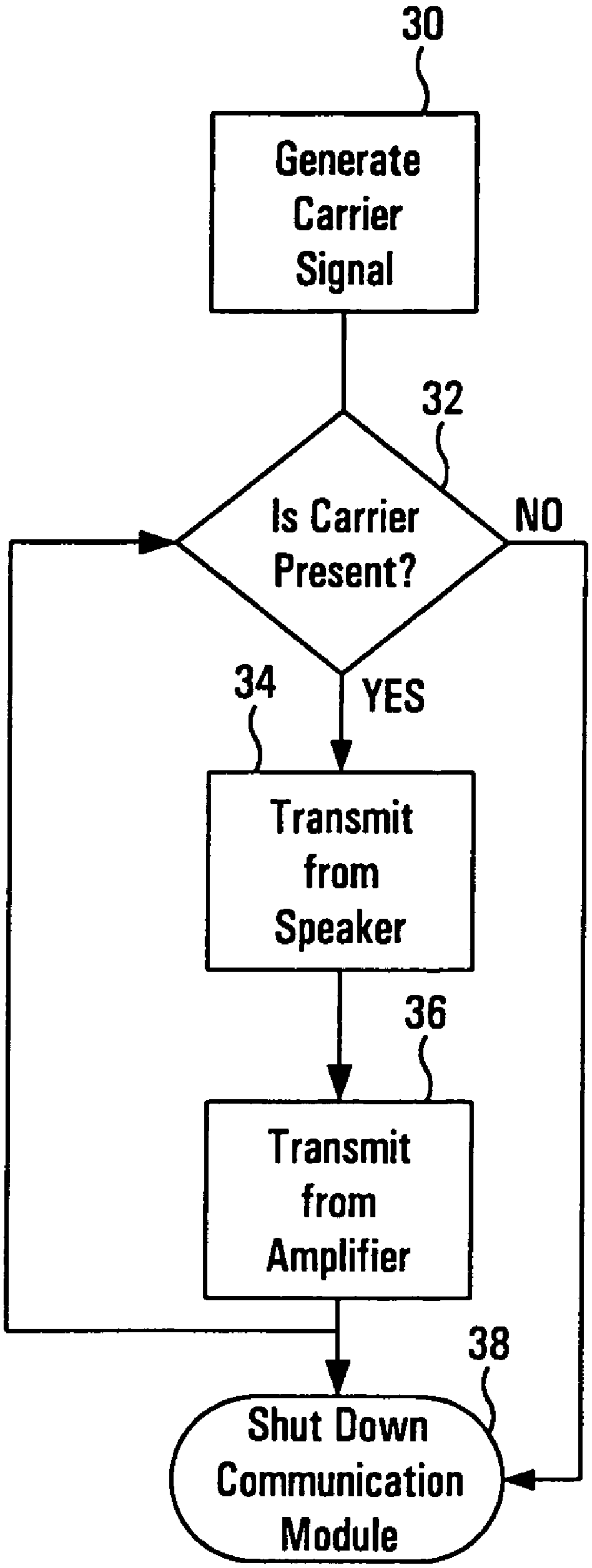
FIG. 3 shows a flowchart for one embodiment of a method for communicating between a speaker and an amplifier.

One embodiment of a method for operating a sound system with intelligent speakers is shown in FIG. 3. The amplifier generates the carrier signal at 30. The high-pass filter will either be passing the high frequency carrier signal or not at 32. If the carrier signal is present, the power is provided to the communications module and transmission from the speaker occurs at 34. In higher-end systems, it may be desirable for the amplifier to send control signals to the speaker, other than the audio data. This would occur at 36, but this is an optional step and not necessary for practice of the invention. The transmission loop repeats until the carrier signal is no longer present. Once the carrier signal is not present at 32, the communications module shuts down at 38.

A concern in using such a communication module and the speaker connection is that the communication may affect speaker performance and degrade the quality of the system. However, some adjustments can overcome that problem. First, the high-pass filter, rectifier and communications module can be designed to present high impedance at all frequencies within the normal audio range of the speaker system. This prevents any significant load from being placed on the connection, which could significantly impact the speaker characteristics. Essentially, this renders the intelligence components of the speaker system transparent.

Another adjustment can separate the carrier signal and control data from the audio signal. The carrier signal and communication from the speaker could be handled in a separate frequency band from the audio signal, selected so as to not have any overlap. Alternatively, the two bands could overlap, at least partially. In this situation, it may be desirable to shut down the communications module as soon as the transmission is completed, to avoid any degradation of the audio signal due to communication signal noise. The communication could transpire at power up of the system, using delays in acquiring a sound production signal to allow communication from the speaker.

An advantage of the speaker with intelligence is that it allows the amplifier to have more complete information with regard to the speaker characteristics. The amplifier would have data on the maximum power handling capacity, the impedance profile and the equalization requirements. For example, the speaker may have a maximum power capacity that is less than that indicated by full volume on the amplifier. The amplifier could then override any volume settings that would otherwise damage a speaker. Similarly, having more exact information than a range of impedance and the equalization requirements will allow the speaker to modulate the audio signal more precisely, resulting in better system performance. It must be noted that the speaker characteristics are the hardware characteristics of the speaker not performance characteristics. These static characteristics do not change for a give speaker, which is why it is possible to shut down the communications module after the transmission.

Thus, although there has been described to this point a particular embodiment for a method and structure for an intelligent audio speaker, it is not intended that such specific references be considered as limitations upon the scope of this invention except in-so-far as set forth in the following claims.

What is claimed is:

1. A speaker system operable to generate sound, comprising:

a speaker operable to generate sound in response to an audio sign received form an audio amplifier, the speaker located in a speaker enclosure that is separate from the audio amplifier and electrically connected to the audio amplifier either through speaker cables or through wireless communication channel; and a communication module also located in the speaker enclosure that is also coupled to the audio amplifier through the speaker cables or wireless communication channel and that provides high impedance at frequencies within an audible range of the speaker system, the communication module solely in response to being powered on by a power signal received from the audio amplifier, and without further communication signaling from the amplifier, generating information that identifies electrical speaker characteristics for the speaker in the speaker enclosure and transmitting the information identifying the electrical speaker characteristics back over the speaker cables or wireless communication channel to the audio amplifier wherein the communication module communicates the electrical speaker characteristic from the speaker system to the audio amplifier using two-tone modulation.

2. The speaker system of claim 1, wherein the speaker system further includes a high-pass filter and rectifier operable to derive output power from the power signal.

3. The speaker system of claim 1, wherein the communication module communicates the electrical speaker characteristics back to the audio amplifier using phase-shift keying.

4. The speaker system of claim 1, wherein the electrical speaker characteristics transmitted by the communication module from the speaker system to the amplifier is transmitted in a separate frequency band from the audio signal.

5. The speaker system of claim 1, wherein the information transmitted by the communication module from the speaker system to the amplifier is transmitted in a frequency band that overlaps the audio signal.

6. A method for operating a sound system, the method comprising:

generating a carrier signal from an amplifier and sending the carrier signal to a speaker system through a connection between the amplifier and the speaker system, wherein the speaker system is located in a speaker housing separate and remote from an amplifier housing containing the amplifier;

rectifying power from the carrier signal in the speaker system, wherein the power is used by a communication module directly coupled to the speaker system and located said speaker housing, the communication module coupled to external connectors or wireless modules on the speaker housing that are used to couple the speaker system to the amplifier through a wired or wireless connection, wherein the communications module contains information identifying electrical operating parameters for the speaker system and also generates a high impedance at frequencies within an audio range of the speaker system; and transmitting information identifying the electrical operating parameters out from the communication module and the speaker system through the external connectors or wireless modules to the amplifier for as long as the carrier signal is present at the speaker system; and including activating the communication module and communicating the electrical operating parameters back to the amplifier solely in response to receiving the rectified power without any other communication signaling form the amplifier; and wherein transmitting information from the speaker system to the amplifier is accomplished using phase-shift keying.

7. The method of claim 6, wherein the information is transmitted in a frequency band separate from a frequency band used by an audio signal.

8. The method of claim 6, wherein the information is transmitted in a frequency band that overlaps a frequency band used by an audio signal.

9. A speaker system, comprising:

a speaker connector operable to connect the speaker system to an amplifier located separate from the speaker system;

speaker hardware operable to generate sound from an audio signal received from the speaker connector;

a high-pass filter operable to pass a high frequency carrier signal received from the speaker connector;

a rectifier operable to receive the high frequency carrier signal and convert it into a power signal; and a communications module operable to receive the power signal from the rectifier and transmit static characteristics of the speaker hardware to the amplifier using the speaker connector, the communications module communicating the static characteristics to the amplifier using phase-shift keying; and wherein the communications module is a device operating inside a speaker housing that contains the speaker hardware, the communications module controlling generation of the static characteristics while providing high impedance at frequencies within an audio range of the speaker system; and wherein the communications module starts transmitting the static characteristics of the speaker system back to the amplifier over the speaker connector when the module is powered on without any further communication messaging or prompting from the amplifier.

* * * * *

UNITED STATES PATENT AND TRADEMARK OFFICE

CERTIFICATE OF CORRECTION

PATENT NO. : 7,031,476 B1
APPLICATION NO. : 09/593924
DATED : April 18, 2006
INVENTOR(S) : Chrisop et al.

It is certified that error appears in the above-identified patent and that said Letters Patent is hereby corrected as shown below:

At column 4, line 15, please replace “audio sign received form” with --audio signal received from--

At column 4, line 19, please replace “through wireless” with --through a wireless--

Signed and Sealed this

Thirty-first Day of October, 2006

JON W. DUDAS
*Director of the United States Patent and Trademark Office*